Nov. 22, 1960  R. M. SHIPLEY, JR  2,960,909
METHOD FOR DETERMINATION OF COLOR OF GEMS
Filed Jan. 7, 1957  2 Sheets-Sheet 1

INVENTOR.
Robert M. Shipley Jr.
BY
A. Schapp
ATTORNEY

United States Patent Office 2,960,909
Patented Nov. 22, 1960

2,960,909
METHOD FOR DETERMINATION OF COLOR OF GEMS

Robert M. Shipley, Jr., Geyserville, Calif.

Filed Jan. 7, 1957, Ser. No. 632,710

1 Claim. (Cl. 88—14)

The present invention relates to improvements in a gem colorimeter, and its principal object is to provide a means for and method of measuring the color of fashioned or cut diamonds, other gems, or other irregularly shaped or transparent or translucent substances.

More particularly, it is proposed to pass a concentrated beam of light through a gem upon a light-sensitive cell, the response of the cell being measured on a standard microammeter.

It is further proposed to provide a filtering means for the beam of light whereby a blue filter and a minus-blue (yellow) filter may be selectively interposed in the beam of light between its source and the gem to obtain different readings or responses on the microammeter.

The response to minus-blue light is then divided by the response to the blue light to produce a unitary figure adapted for reading against a scale having a series of relative values for the yellow content of the gem.

It is additionally proposed to provide for the use of a standard cell to be substituted in the system for the gem under observation and intended to serve as a standard of comparison in equalizing the densities of the two filters.

Further objects and advantages of my invention will appear as the specification proceeds and the new and useful features of my colorimeter will be fully defined in the claim hereto attached.

Figure 1:
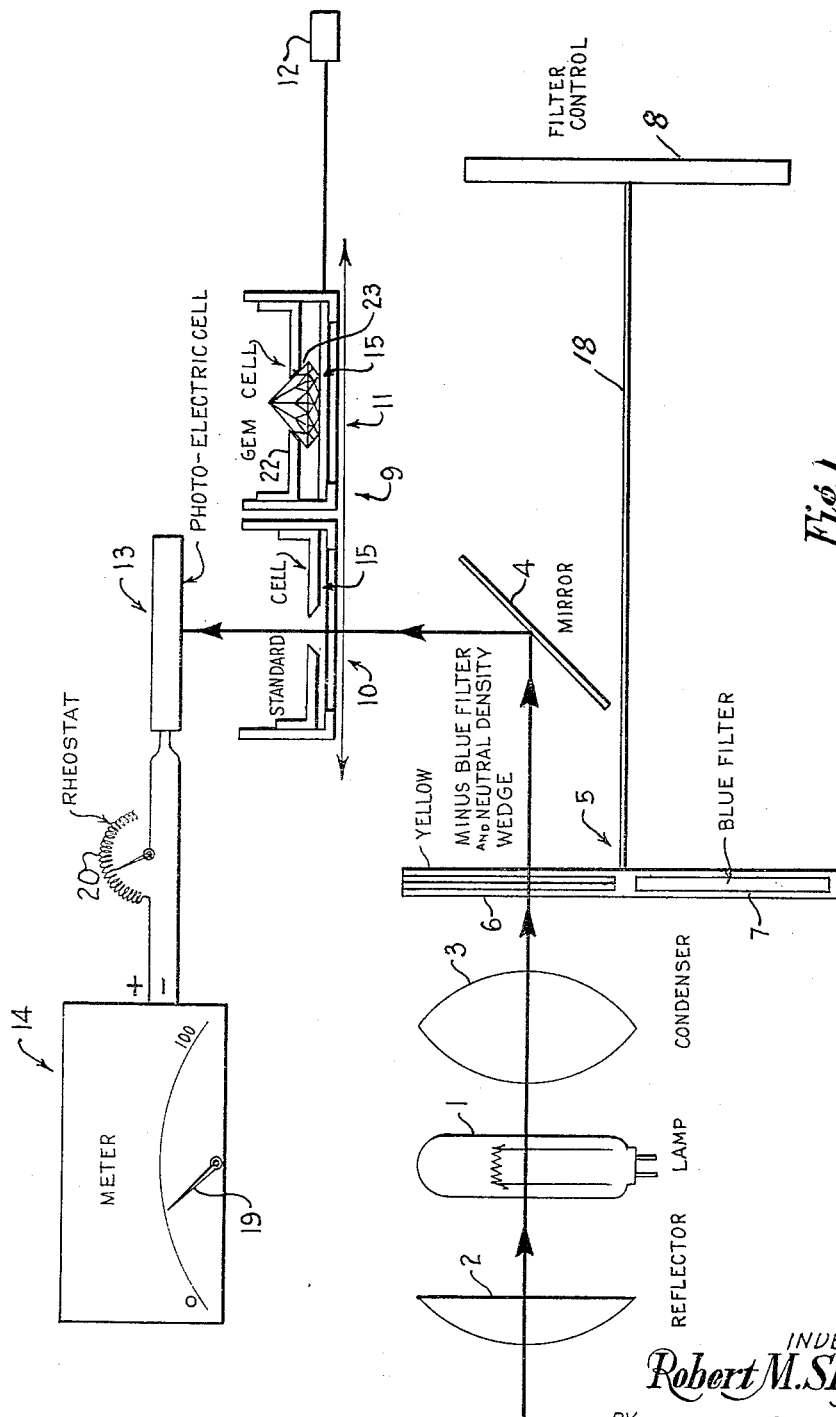

The preferred form of my invention is illustrated in the accompanying drawing forming part of this application, in which:

Figure 1 shows a diagrammatic view of my colorimeter, and

Figure 2:
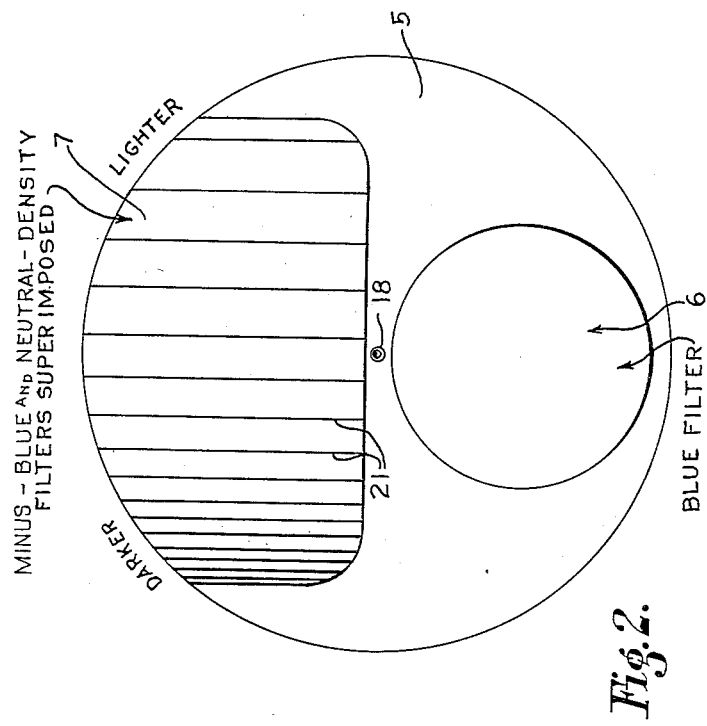

Figure 2, a detail view of a filter used in my invention.

While I have shown only the preferred form of my invention, it should be understood that various changes or modifications may be made within the scope of the claim hereto attached without departing from the spirit of the invention.

Referring to the drawing in detail, my colorimeter comprises in its principal features, a lamp 1, reflector 2 located behind the lamp, a condenser 3 forwardly of the lamp, a mirror 4 mounted to deflect the light upward, a slide 9 mounted above the mirror and having a standard cell 10 and a gem cell 11 mounted therein, and operable by a handle 12 for bringing either cell into the optical system, a light-sensitive cell 13 mounted above the slide and a microammeter 14 connected to and operated by the light-sensitive cell.

A disc 5 is formed with two oppositely arranged windows 6 and 7, one of them constituting a blue filter, and the other one a minus blue or yellow filter. The latter has superimposed on it a neutral density wedge which may be positioned in the optical system by means of the filter control 8 at the end of the rod 18.

The term "wedge" applied to the window 7 does not imply, in modern use, an actual wedge-shaped piece of glass, although the term originated from the use of an actual wedge-shaped piece of grey glass.

The modern practice, is to partially coat a clear piece of glass with a very thin coating of metal, this coat varying in light reflecting power from one side of the glass to the other, and inversely varying in light-transmitting power. While this functions optically as a wedge, and is commonly referred to as such, there is no physical wedge shape. This optical component is also rather generally referred to as a variable beam-splitter. In the drawing, the lines 21 define fields of different densities, increasing from one end to the other.

The disc 5 is mounted on the revolvable shaft 18, operative by the control 8 for bringing one or the other of the filter windows into the light system, and for balancing the output of minus-blue light to the output of blue light.

The slide 9 is mounted in such a manner that either cell may be moved into the beam of light, the cell 10 serving as a standard, and the cell 11 to hold the gem under observation.

Each cell is provided with a diffuser plate 15 designed to pass sufficient light through the gem for the purposes of the system and to partly overcome the tendency of these gems to reflect most of the light within themselves.

The diffuser plates may be made of ground glass, but actually I find that this material does not give entirely satisfactory results, and I, therefore use a type of glass which is variously known as coated glass or flashed opal glass.

The microammeter 14 is provided with a suitable scale numbered zero to one hundred; an indicator 19 is movable over the scale, with a rheostate 20 serving as an adjusting means for the indicator.

A baffle 22 in the form of a shallow bucket with a hole in it, is made to rest on the gem, shown at 23, and serves the purpose of cutting off any stray light. A similar bucket is used in the standard cell. I have found that a slightly larger hole in the baffle covering the gem gives better results than if both baffles have the same sized hole.

In operation:

With the blue filter and the standard cell in the line of light, and the gem to be tested outside, the indicator of the microammeter will swing toward one hundred, and is adjusted, by means of the rheostat 20 to stop exactly at 100.

Next, the operator slides the gem cell 11 into the optical system. The gem under observation, being less transparent than the standard, the indicator 19 will naturally swing back and possibly come to stop at 20.0. This number becomes the divisor in the computation to follow.

Now, the operator moves the standard cell and the minus blue filter into the optical system. The minus-blue filter is of varying density and may be adjusted to bring the indicator of the microammeter again to 100. Since this balancing is done by optical means, the electric circuit consisting of photo-electric cell, meter and rheostat, remains constant to give consistent readings for both blue and minus-blue filters.

And finally, the operator slides the gem cell into the optical system, and, upon reading the meter, may find that the indicator stops at 34.4. This figure constitutes the dividend in the computation.

Dividing 34.4 by 20.0 gives the figure 1.720, which figures definitely classifies the gem as to its yellow content as compared with other gems measured by the same process. A similar classification may be arrived at by subtracting one of the figures from the other.

The individual responses obtained (20.0 and 34.4) may, of course, be transferred into a suitable slide rule or computing machine which automatically indicates the answers on a scale of sufficient range to allot to each tested gem its appropriate place as compared with other gems subjected to the same test.

Such a scale may be divided into units indicating trade standards of color.

I claim:

The method of measuring the color of a gem or the like comprising the steps of passing a beam of light through a blue filter and a standard cell to impinge upon a photoelectric cell, adjusting the circuit of the photoelectric cell to a predetermined resistance, placing a gem under observation within such beam of light to replace the standard cell, recording the value of current flowing in the photoelectric circuit, removing the gem under observation from the beam of light and replacing the standard cell in such beam of light, removing the blue filter from the beam of light and replacing the same with a minus blue filter of varying density and adjusting the density of the minus blue filter so as to obtain circuit conditions in the photoelectric circuit identical with those first achieved using the blue filter and the standard cell, removing the standard cell and replacing the gem under observation in the path of the beam of light, and recording the current value in the photoelectric circuit.

References Cited in the file of this patent

UNITED STATES PATENTS

| | | |
|---|---|---|
| 1,744,485 | Michel et al. | Jan. 21, 1930 |
| 2,421,344 | Mass | May 27, 1947 |

FOREIGN PATENTS

| | | |
|---|---|---|
| 450,576 | Great Britain | July 21, 1936 |
| 804,407 | France | Aug. 3, 1936 |
| 837,918 | France | Nov. 28, 1938 |
| 812,967 | Germany | Sept. 6, 1951 |

OTHER REFERENCES

"Cylindrical Light Scattering Cell," Witnauer et al., The Review of Scientific Instruments, vol. 23, No. 2, February 1952, pages 99, 100.